May 7, 1963  A. E. W. JOHNSON  3,088,413
VEHICLE WITH HYDROSTATIC TRANSMISSION PROPELLED
BY FREE PISTON ENGINE HYDRAULIC PUMP
Filed Nov. 28, 1960  6 Sheets-Sheet 1

Inventor:
Arnold E. W. Johnson
Paul O. Pippel
Atty.

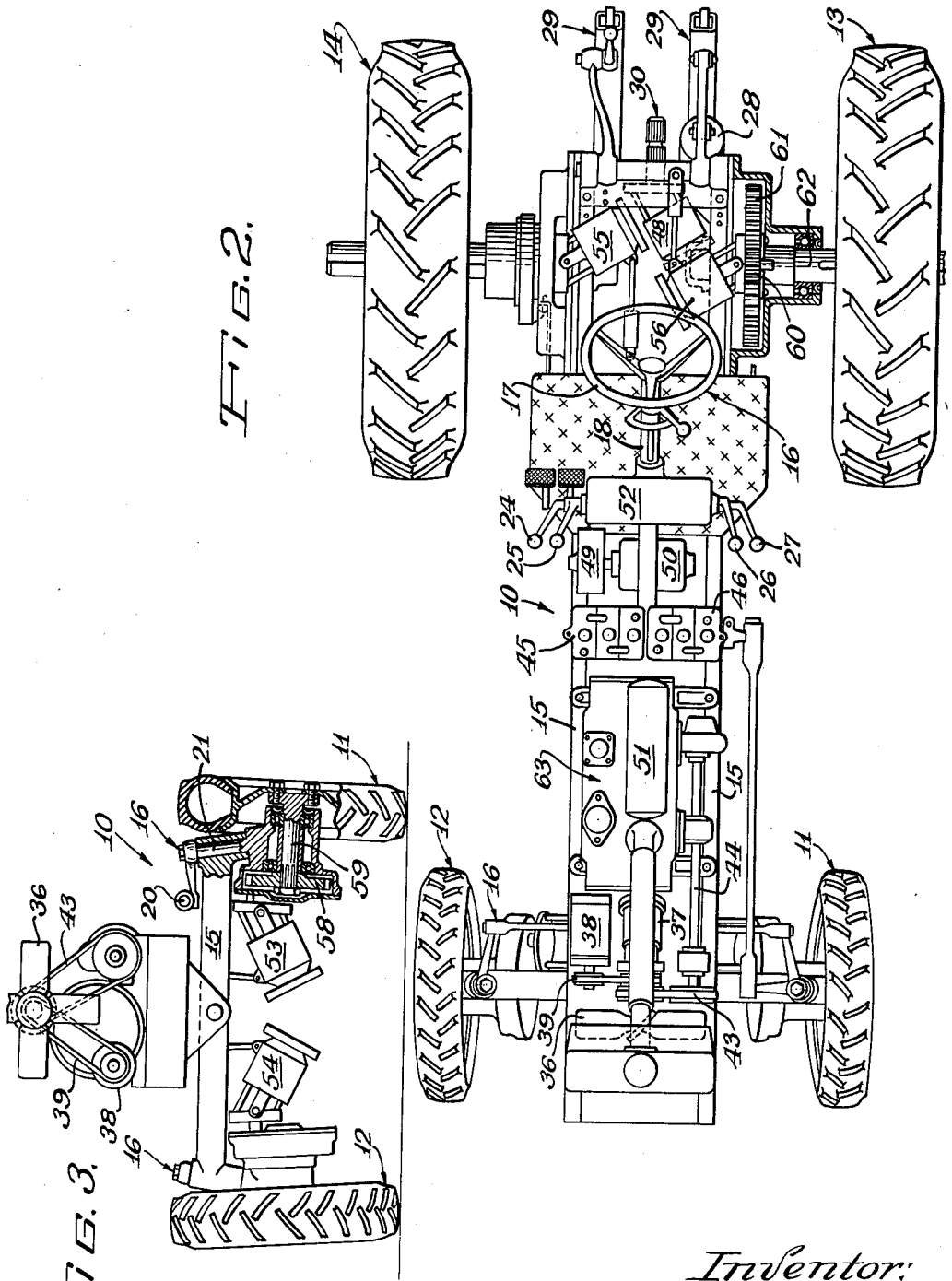

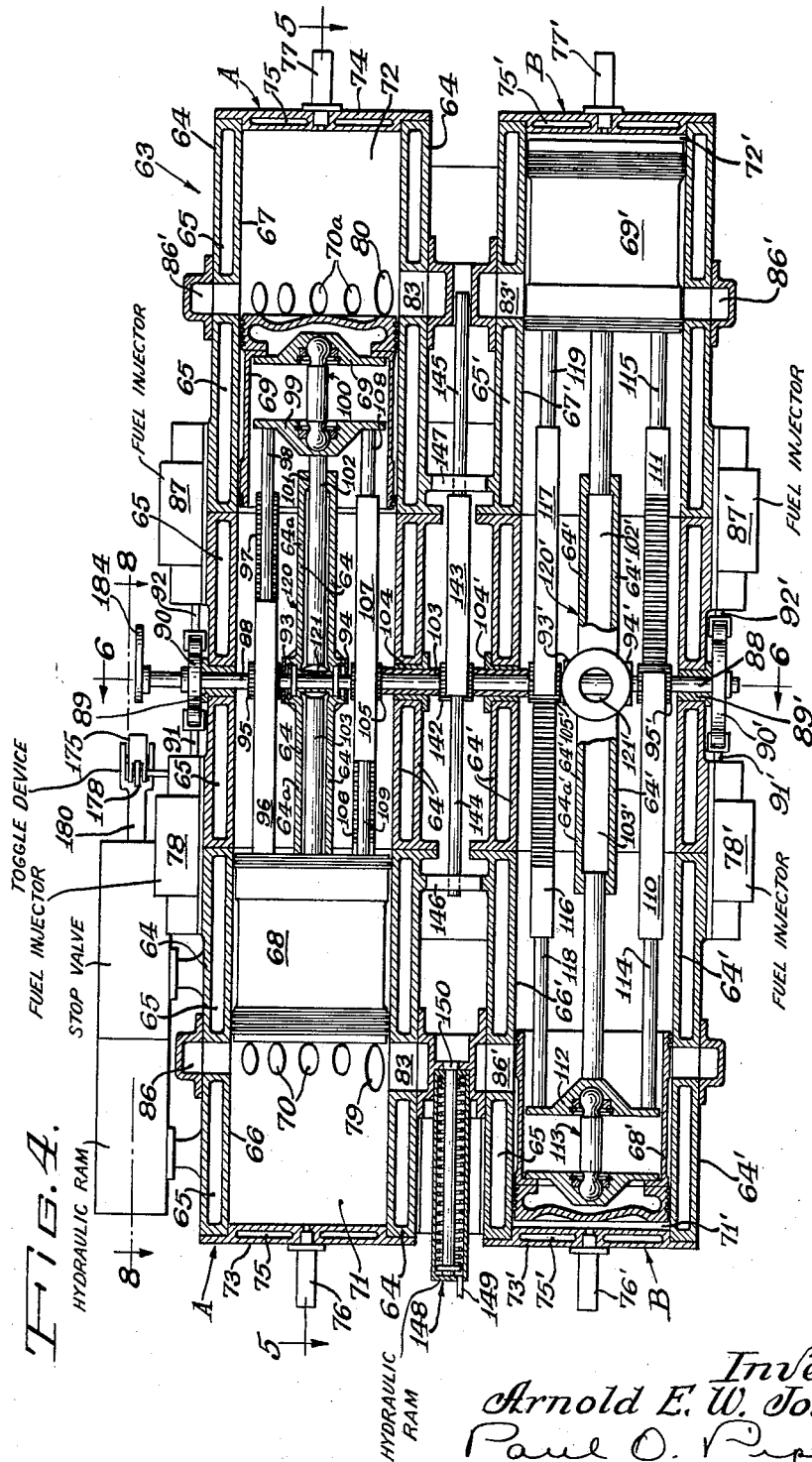

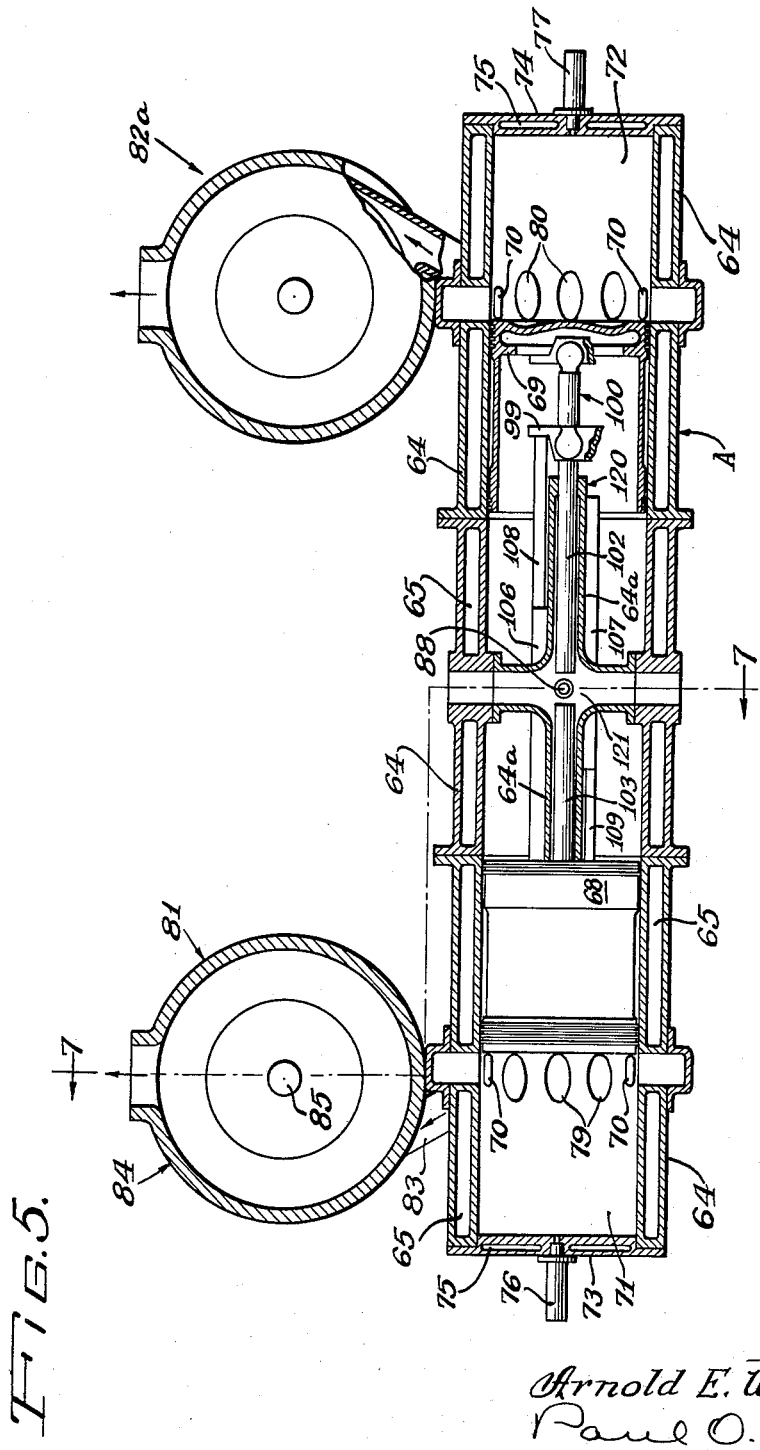

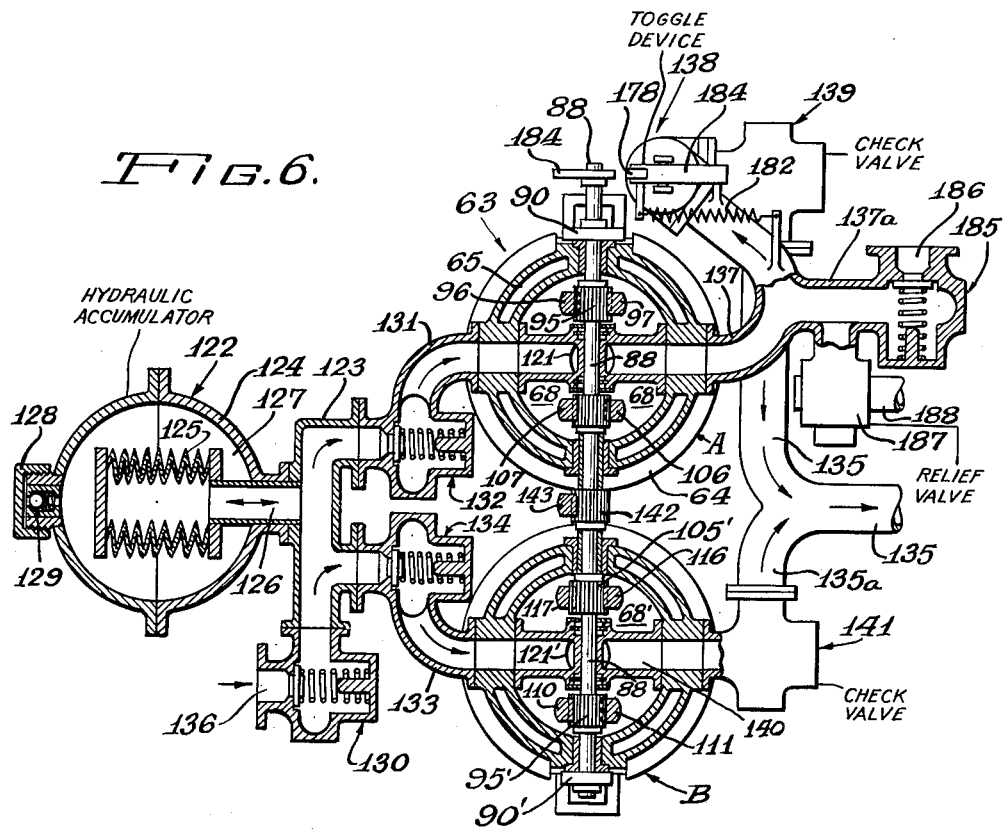

May 7, 1963 A. E. W. JOHNSON 3,088,413
VEHICLE WITH HYDROSTATIC TRANSMISSION PROPELLED
BY FREE PISTON ENGINE HYDRAULIC PUMP
Filed Nov. 28, 1960 6 Sheets-Sheet 6

Inventor:
Arnold E. W. Johnson
Paul O. Pippel
Atty.

United States Patent Office 3,088,413
Patented May 7, 1963

3,088,413
VEHICLE WITH HYDROSTATIC TRANSMISSION PROPELLED BY FREE PISTON ENGINE HYDRAULIC PUMP
Arnold E. W. Johnson, Oak Park, Ill., assignor to International Harvester Company, Chicago, Ill., a corporation of New Jersey
Filed Nov. 28, 1960, Ser. No. 71,949
6 Claims. (Cl. 103—54)

This invention relates to a novel free-piston engine hydraulic pump as a source of fluid under pressure power. More in particular this invention relates to a free-piston engine hydraulic pump as a source of fluid under pressure power for propelling a vehicle having a hydrostatic power transmission system.

There are several known ways of obtaining, as a source of power, hydraulic fluid under pressure. In mobile structures such as a tractor hydraulic fluid under pressure may be obtained by driving a suitable hydraulic pump by direct or indirect connection to an internal combustion engine such as a conventional diesel or gasoline engine. Free-piston engines have been employed as gasifiers for driving a turbine. Having turbine power it is obvious that the turbine may be employed to drive a hydraulic pump thereby creating a source of fluid under pressure. Hydraulic pressure thus obtained can be used as a source of power for propelling a vehicle through a conventional hydrostatic power transmission means.

The above mentioned means for obtaining hydraulic pressure as a source of power for propelling a vehicle are bulky, expensive and inefficient largely because of the frictional losses due to the numerous working parts involved. It is, therefore, the prime object of this invention to provide a self-propelled mobile vehicle having a hydrostatic drive transmission in combination with a compact free-piston engine hydraulic pump.

A further important object of this invention is a free-piston engine hydraulic pump in a compact unitary structuce as a source of hydraulic fluid pressure for propelling a vehicle and its power accessories.

A still further object of this invention is to provide a compact hydraulic fluid pressure power plant comprising a free-piston engine having internal hydraulic pump means disposed therein.

Another important object of this invention is to provide a free-piston engine hydraulic pump according to the preceding objects wherein the engine comprises two pairs of power pistons in opposed relation synchronized for firing one pair of pistons alternately with respect to the other pair of power pistons.

Still another important object of the invention is to provide a free-piston hydraulic pump according to the preceding object whereby the combustion chambers of the engine are disposed in the outboard position with respect to the power pistons thereof.

A yet further object of this invention is to provide a free-piston engine hydraulic pump according to the preceding objects having an improved synchronizing mechanism for maintaining each pair of two pairs of opposed power pistons in alternate firing relation and eliminate the necessity of including resilient reaction means.

These and other desirable and important objects inherent in the invention will be more readily understood from the ensuing description, the appended claims and the annexed drawings wherein:

FIGURE 2 is a plan view of the tractor of FIGURE 1 with the hood and operator's seat removed illustrating a general arrangement of a tractor with a hydrosatic transmission propelled by a free-piston engine hydraulic pump of this invention.

FIGURE 3 is a front end view of the tractor of FIGURE 1 partly in section and partly broken away and with radiator grill and hood removed illustrating the hydraulic drive arrangement for the front wheels.

FIGURE 4 is a longitudinal view, in section, of the free-piston engine hydraulic pump of this invention.

FIGURE 5 is a plan view, in section, taken along the line 5—5 of FIGURES 4 and 7, illustrating further details of the invention not apparent from FIGURE 4.

FIGURE 6 is a transverse sectional view taken along the line 6—6 of FIGURE 4 illustrating hydraulic fluid inlet and outlet conduits and valve arrangement of the free-piston engine hydraulic pump of this invention.

FIGURE 8 is a plan view taken on line 8—8 of FIGURE 4, partly in section and partly broken away, illustrating the valving arrangement employed in the operation of starting the free-piston hydraulic pump of this invention.

The term "hydrostatic transmission" as herein employed is intended to mean a vehicle propelled by hydraulic motors, usually having rotating elements, energized by a remote source of hydraulic fluid under pressure.

Figure 1:
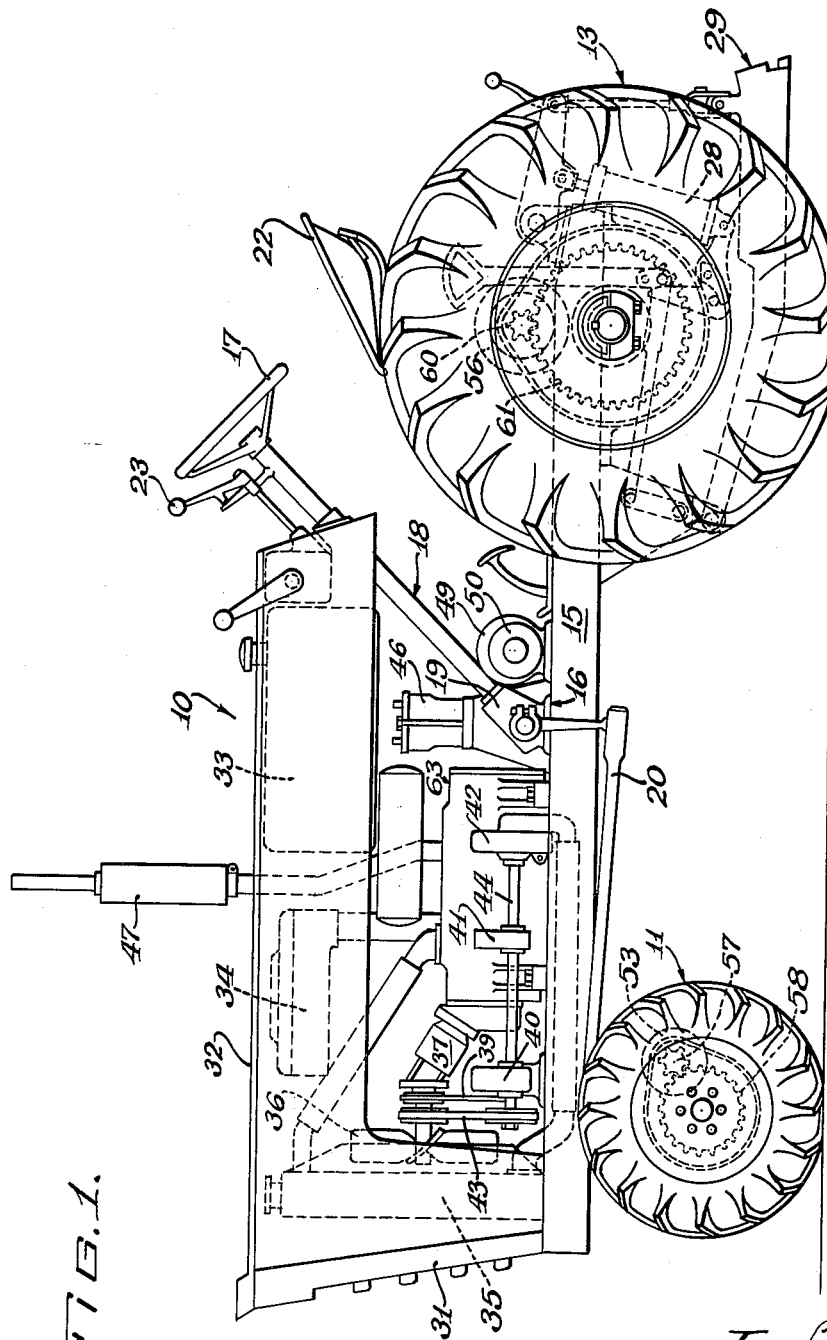
FIGURE 1 illustrates a side elevation of an agricultural four wheel drive tractor having a hydrostatic transmission propelled by a free-piston engine hydraulic pump of this invention.

Referring now to FIGURES 1 to 3 the numeral 10 designates a vehicle such as a tractor. Although the tractor 10 as shown is that of an agricultural type it should be understood that the free-piston engine hydraulic pump of this invention may also be employed as a source of hydraulic fluid under pressure for propelling other types of vehicles such as automotive or marine vehicles for examples. The vehicle 10 is provided with the usual front wheels 11 and 12, and rear wheels 13 and 14 in ground engagement. The tractor 10 has a frame 15 mounted in support relation with respect to the wheels 11—14 in a conventional manner. A conventional steering means indicated generally at 16 is provided for controlling the path of travel for the vehicle 10. The steering means 16 may comprise an operator's steering wheel 17, steering column 18, and steering gear 19 connected to the front wheels 11—12 by steering rod 20 by suitable linkage to the shafts, one of which is shown at 21 (FIGURE 3) in steering relation.

The operator's station is provided with a seat 22, a hydraulic valve control lever 23 for controlling the rate of speed of the tractor 10 and, in addition, a series of hydraulic control valve operating levers 24–27 for controlling various power accessories such as, for example, the cylinder 28 of the hitch device 29 for trail-behind implements and the hydraulically driven power take-off shaft 30 driven by hydraulic motor 48. Other types of power accessories may also be controlled by the levers 24–27 such as a conventional bulldozer shovel (not shown).

The tractor 10 may be provided with a front grill 31 and hood 32 supported by the frame 15. Within the hood 32 is a fuel tank 33 and air cleaner or filter 34, both being of conventional construction. Since the free-piston hydraulic pump of this invention is liquid cooled, a conventional heat exchanger or radiator 35 is provided for dissipating excess heat from the engine pump. A conventional fan is shown at 36 for increasing the efficiency of the radiator 35. The fan 36 is driven by a hydraulic motor 37 of the conventional rotatable type. The hydraulic motor 37 also drives an electric generator 38 through V-belt pulley arrangement 39 as best shown in FIGURE 2. In addition the hydraulic motor 37 also drives a scavenging sump pump 40 for collecting excess oil, an engine lubricating oil pump 41, and a coolant water circulating pump 42 all being driven by V-belt pulley arrangement 43 and shaft 44.

Electric storage batteries 45, 46 are provided for lights and engine starting and 47 is a conventional exhaust gas muffler. At 49 is an air compressor which may be driven by either an electric or hydraulic motor 50 for charging tank 51. Compressed air from tank 51 is for miscellaneous accessories as well as a means for charging fuel to the tractor engine under pressure if desired. At 52 is a housing containing the various hydraulic control valves operated by levers 24–27 previously described.

Each of the ground engaging wheels 11–14 are independently driven by separate hydraulic motors 53–56 respectively. The front wheel 11 is driven by hydraulic motor 53 through pinion 57 meshed with gear 58 connected in drive relation to wheel shaft 59 as best shown in FIGURES 1 and 3. The drive connection between hydraulic motor 54 and wheel 12 is similar to that for wheel 11 and hydraulic motor 53 just described.

The rear wheel 13 is driven by hydraulic motor 56, pinion 60 and gear 61 connected in drive relation to wheel shaft 62 as best shown in FIGURE 2. The drive connection between hydraulic motor 55 and wheel 14 is similar to that for wheel 13 and hydraulic motor 56 already described.

The numeral 63 designates an embodiment of a free-piston engine hydraulic pump according to this invention as a power plant or source of hydraulic fluid under pressure for energizing the various hydraulic motors previously described. The details of the free-piston engine hydraulic pump 63 will now be described.

Referring now to FIGURE 4 it will be seen that the engine pump 63 is comprised of two units integrally mounted together. The upper unit A having a pair of power pistons in opposed relation is similar to the lower unit B except that the power pistons of unit A are 180° out of phase with respect to the power pistons of unit B or, in other words, the power pistons of unit A are in alternate firing relation with respect to the power pistons of unit B.

Figure 7:
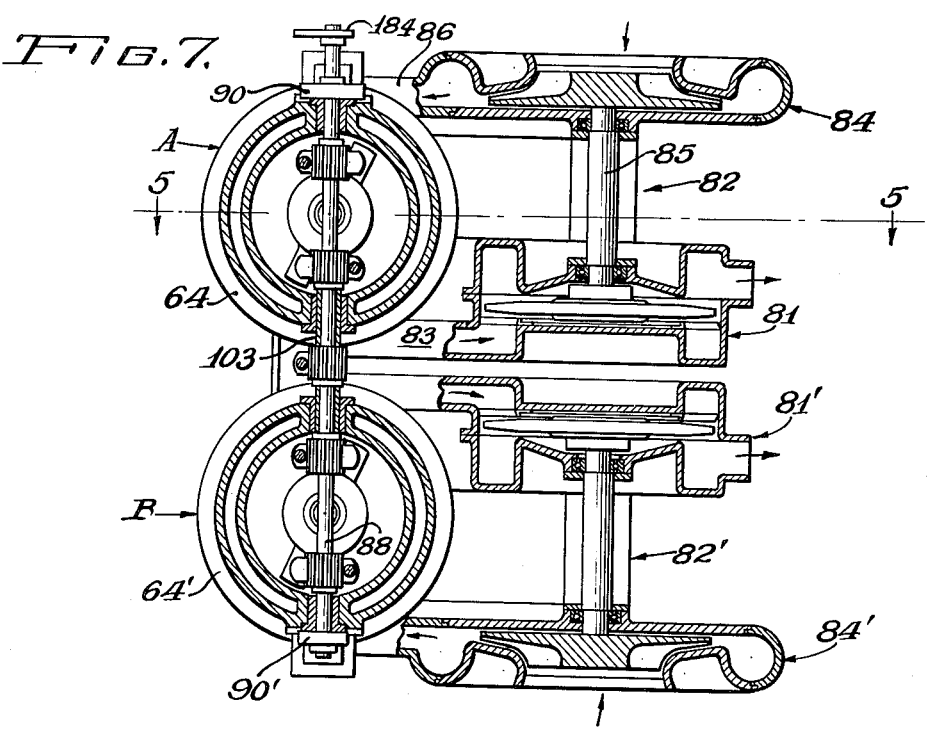
FIGURE 7 is a sectional view taken along the line 7—7 of FIGURE 5 showing the arrangement of tturbo-chargers for the free-piston engine hydraulic pump of this invention.

The upper unit A is comprised of a block or casing 64 having numerous water or liquid coolant passages 65. The casing 64 is provided with a pair of axially aligned cylinder bores 66 and 67. Slidably disposed in cylinder bore 66 is a power piston 68, and likewise power piston 69 is slidably disposed in cylinder bore 67. The casing 64 is provided with a series of peripherally disposed air inlet ports 70 and 70a leading from a source of compressed air into the outboard combustion chambers 71 and 72 respectively. The head members 73 and 74 may be provided with liquid coolant passages 75 and fuel inlet ports 76 and 77 respectively. The fuel inlet port 76 is communicatively connected (not shown) with a conventional fuel injector mechanism indicated at 78. Also the casing 64 is provided with peripherally disposed exhaust ports 79 and 80. The exhaust port 79 is communicatively connected to the inlet side of the gas turbine 81 of a conventional turbo-charger 82 through manifold 83 as best shown in FIGURES 5 and 7. The exhaust gas from the turbine 81 is discharged by conventional means through the muffler 47 of FIGURE 1. The gas turbine 81 drives a turbine air compressor 84 (FIGURE 7) through shaft 85. The compressor 84 draws air axially and discharges it under compression into manifold 86 which communicates with air inlet ports 70 of casing 64 and combustion chamber 71. From this it can be seen that hot exhaust gas from the combustion chamber 71 passes through exhaust ports 79 into manifold 83 and thence into the inlet side of gas turbine 81. The turbine 81 thus driving the compressor 84 for providing compressed air to combustion chamber 71 through manifold 86 and air inlet ports 70. At this point it should be noted that the gas turbine of turbocharger 82′ (FIGURE 7) communicates with similar exhaust ports (not shown) of combustion chamber 71′ of unit B. Similarly the compressor 84′ of turbocharger 82′ communicates with the air inlet ports (not shown) of the leftward portion of unit B.

The air inlet ports 70a and exhaust ports 80 of combustion chamber 72 and air inlet ports (not shown) and exhaust ports (not shown) of combustion chamber 72′ are connected to turbochargers indicated generally at 82a (FIGURE 5) in a similar manner as that above described for turbochargers 82 and 82′.

The fuel inlet port 77 is communicatively connected to a conventional fuel injector mechanism 87 in a conventional manner for furnishing fuel to combustion chamber 72 simultaneously with that of fuel injector mechanism 78 and fuel inlet port 76 for combustion chamber 71.

Unit B of the engine pump 10 is constructed similarly to that of unit A above described and corresponding parts thereof bear the same numeral designations except that each is primed unless otherwise stated. Coupling means will now be described for maintaining power pistons 68 and 69 of unit A synchronized in opposed relation as well as that for maintaining power pistons 68′ and 69′ in synchronized opposed relation. Further, the same means maintains power pistons 68 and 69 of unit A in 180° out of phase relation with power pistons 68′ and 69′ of unit B whereby power pistons 68 and 69 are in alternate firing relation with respect to power pistons 68′ and 69′.

Referring now to FIGURE 4 a transversely disposed main shaft 88 is journalled for rotation on the casings 64 and 64′ by conventional bearing members such as bushings 89, 89′, 93, 93′, 94 and 94′ and extending externally thereof. Externally and adjacent to the casings 64 and 64′ and rigidly connected to the main shaft 88 are a pair of elliptical shaped cams 90 and 90′ respectively. The major axis of cam 90 is positioned at 90° with respect to the major axis cam 90′. Rotation of the main shaft 88 in either direction rotates cam 90 which serves to actuate simultaneously the fuel injector mechanisms 78 and 87 through their respective plunger rods 91 and 92. Similarly the cam 90′ serves to actuate fuel injecter mechanisms 78′ and 87′ through their respective plunger rods 91′ and 92′. However, since cam 90′ is 90° out of phase with cam 90 it is readily apparent that when fuel injector mechanisms 78 and 87 of unit A are actuated for charging fuel into combustion chambers 71 and 72 respectively, the fuel injectors 78′ and 87′ of unit B are de-actuated, and vice versa.

Constrained for rotation with the main shaft 88 are pinions 95 and 95′ and thus pinions 95 and 95′ rotate with the main shaft 88. Meshed with the pinion 95 in diametrically opposed relation are a pair of rack members 96 and 97 as best shown in FIGURE 4. The rack member 96 through rod 98 is connected to a yoke member 99 disposed within the power piston 69 of unit A. The rack member 97 is connected to a yoke member (not shown) in power piston 68 of unit A in a similar manner to that just described. The yoke member 99 is pivotally connected to the power piston 69 by a ball and socket linkage generally indicated at 100. This arrangement permits greater permissible manufacturing tolerances in the alignment of cylinder bore 67 with pump bore 101. It will become apparent later that the yoke member 99 does not pivot angularly about the ball and socket linkage 100 but only allows movement in a direction transverse to the axis of cylinder bore 67 to accommodate the reception of pump piston 102 within pump bore 101 in casing 64. Thus after assembly there is virtually no pivotal movement of the yoke member 99 with respect to its power piston 69.

Concentrically disposed about the main shaft 88 in journal relation is a sleeve shaft 103. The sleeve shaft 103 is journalled for rotation by conventional bearing members such as bushings 104 and 104' and extends into both units A and B as shown in FIGURE 4. On the end portion of sleeve shaft 103 extending into unit A is a pinion 105 and likewise the other end portion extending into unit B is a pinion 105'. Both pinions 105 and 105' are constrained for rotation with the sleeve shaft 103.

Meshed with pinion 105 in diametrically opposed relation are a pair of rack members 106 and 107. The rack member 106 through rod 108 is connected to yoke member 99 in power piston 69 while the rack member 107 through its rod 109 is connected to the yoke member (not shown) in power piston 68. At this point it will be observed that rack members 96 and 106 moving with power piston 69 are meshed with their respective pinions 95 and 105 in diametric opposed relation with respect to the common axis of both pinions. Thus, for example, when the power piston 69 moves inboardly the pinion 95 drives the main shaft 88 in one direction and the pinion 105 simultaneously drives the sleeve shaft 103 in the opposite direction. Since the rack member 97 is meshed in diametric opposed relation with its pinion 95 with respect to rack member 96 and also rack member 107 is meshed in diametric opposed relation with its pinion 105 with respect to rack member 106 it can be seen that power piston 68 must move inboardly simultaneously with inboard movement of power piston 69.

Reference is now made to unit B of the engine pump 63 in FIGURE 4. It will be seen that a pair of rack members 110 and 111 are meshed with pinion 95' in opposed diametric relation. The rack member 110 through rod 114 is connected with a yoke member 112 disposed within power piston 68' wherein the yoke member 112 is similar in construction with that of yoke member 99 in power piston 69. Likewise the yoke member 112 is connected to the power piston 68' by a ball and socket linkage 113 similar to the linkage 100 of power piston 69. At this point it is mentioned that power pistons 68 and 69' are also provided with yoke members and linkage similar to yoke members 99 and 112 and linkages 100 and 113. The rack member 111 through rod 115 is connected to the yoke member (not shown) in power piston 69'.

Another pair of rack members 116 and 117 are in meshed relation with pinion 105' in diametric opposed relation. The rack member 116 through rod 118 is connected to the yoke member 112, while rack member 117 through rod 119 is connected to the yoke member (not shown) in power piston 69'. The casings 64 and 64' may suitably be provided with bearing elements (not shown) engaging the reverse sides of the rack members to prevent disengagement from their respective pinions as is conventional with rack and pinion assemblies.

In the position shown in FIGURE 4 the power pistons 68' and 69' of unit B are in firing position. When firing occurs simultaneously in the combustion chambers 71' and 72' the explosion of fuel-air mixture therein urges the power pistons 68' and 69' inboardly. At the instant of firing the power pistons 68 and 69 of unit A are inboard. Now as the power pistons of unit B move inboardly the rack members 110 and 111 drive pinion 95' and main shaft 88 counterclockwise as viewed in FIGURE 5. Driving the main shaft 88 counterclockwise also drives pinion 95 in unit A counterclockwise. The counterclockwise movement of pinion 95 now drives rack member 96 in a rightward direction as viewed in FIGURE 4 thus driving power piston 69 outboardly on its compression stroke. Similarly the counterclockwise rotation of pinion 95 drives rack member 97 leftwardly thereby driving power piston 68 outboardly on its compression stroke.

At the same time the rack member 116 moves rightwardly and rack member 117 moves leftwardly which drives pinion 105' in a clockwise direction. Clockwise rotation of pinion 105' also drives sleeve shaft 103 and pinion 105 in a clockwise direction which in turn drives rack members 106 and 107 outboardly thus driving power pistons 68 and 69 outboardly on their compression stroke. It can thus be readily appreciated that power piston 68 of unit A always moves in the same direction at the same time as power piston 69' of unit B. In the same manner power piston 69 of unit A moves in the same direction as power piston 68' of unit B. However the power pistons of unit A are always 180° out of phase with respect to the power pistons of unit B, that is to say, when the power pistons of unit A are moving inboardly the power pistons of unit B move outboardly.

From the above it can be seen that resilient reaction chambers, commonly referred to as "bounce" chambers generally relied upon for compression stroke energy, are in this construction eliminated for the fuel-air compression stroke of the power pistons of one unit culminating in combustion serves to drive the power pistons of the other unit on their subsequent compression stroke. Thus units A and B are dependent upon each other for energy in fuel-air compression stroke.

At this time it will be recalled that in conventional twin power piston types of free-piston engines only one rack member is connected to each of the power pistons and both rack members are meshed with a pinion in diametric opposed relation. The arrangement effectively maintains the two power pistons of a conventional free-piston engine in opposed synchronized relation. However it is also apparent that in the conventional engine the rack members and pinion are virtually under a no-load condition at all times. But in the present invention the rack members and associated pinions are under loaded condition for the pistons for one unit on inboard movement (power stroke) must drive the pistons of the other unit on their compression stroke. Now if only one rack member is provided for each power piston, the yoke member, such as 99, would rotate on the ball and socket linkage 100, which of course would be unsatisfactory. On the other hand if the rack member 99 were connected rigidly to the power piston 69 the power piston 69 would be urged rotatively in an axis transverse with respect to the axis of cylinder bore 67 which of course results in high wear on one side of the cylinder bore 67. The arrangement shown and described wherein each power piston has two rack members results in a balanced load confined in an axial direction. Furthermore such arrangement permits greater manufacturing tolerances in the matter of aligning the axis of cylinder bore, e.g., 67, with the pump bore 101 as both bores are in the casing 64.

The cams 90 and 90' are constrained for rotation with the main shaft 88 and are provided with elliptically shaped camming surfaces. However, the elliptical major axis of the cam 90 is positioned at right angles with respect to the elliptical major axis of cam 90'. Thus, in the position illustrated in FIGURE 4 the fuel injector mechanisms 78' and 87' are actuated for charging fuel under pressure to fuel inlet ports 76' and 77' and combustion chambers 71' and 72', respectively, of unit B. Cam 90 in the position shown permits fuel injector mechanisms 78 and 87 of unit A to de-actuate.

The hydraulic pump of the engine pump 63 will now be described.

Referring again to FIGURE 4 it will be seen that in alignment with the axis of movement of power pistons 68 and 69 of unit A is a hydraulic pump generally indicated at 120. The pump 120 has a stationary pump cylinder 64a which, in the embodiment shown, is a portion of the casing 64. The pump cylinder 64a is provided with a bore 101 adapted to slidably receive hydraulic pump piston 102 which is connected to yoke 99 for movement with power piston 69. The bore 101 extends through the pump cylinder 64a and is also adapted to receive hydraulic pump piston 103. The pump piston 103 is connected for movement with power piston 68 in a similar manner as pump piston 102 is connected for movement with power piston 69 just described.

At the mid-section of the pump cylinder 64a the main shaft 88 intersects the bore 101 at right angles forming an annular shaped pump chamber 121 with the inboard end surfaces of pump pistons or plungers 102 and 103. From this it can be seen that if suitable hydraulic fluid inlet means and outlet means are communicatively connected to the pump chamber 121, liquid entering the inlet means will be discharged to the outlet means because the pump pistons 102 and 103 reciprocate in opposed relation with power pistons 69 and 68 respectively. The pumps in unit B are identical with that of the above described unit A, the elements thereof bearing the same numeric designations except the latter are primed.

The hydraulic inlet means and outlet means will now be described.

Referring now to FIGURE 6 it will be seen that a low pressure hydraulic accumulator 122 is communicatively connected to conduit 123. The accumulator 122 may conveniently be comprised of a hollow sphere 124 having a flexible bellows 125 disposed therein. The internal volume of the bellows 125 is communicatively connected to the conduit 123 through port 126. The volume 127 external of the bellows and internal of the sphere is pressurized with an elastic fluid preferably inert such as nitrogen gas although compressed air may be used. Pressurizing of the accumulator 122 is accomplished by removal of the cap 128 and connecting a source of gas under pressure thereto. The gas passes the inlet check valve 129 into the volume 127. The magnitude of gas pressure in the volume 127 should be such that the bellows 125 will function when the hydraulic pressure in port 126 is of low order, for example 100–200 p.s.i.

Hydraulic fluid enters the conduit 123 through the inlet side of relief valve 130 which, for example, may be set to open at 100 p.s.i. Hydraulic fluid in the conduit 123 passes into conduit 131 through inlet check valve 132. The conduit 131 leads directly to pump chamber 121 of unit A through the casing 64 of the engine pump 63. In a similar manner hydraulic fluid passes from conduit 123 to conduit 133 through inlet check valve 134 and the conduit 133 leads to pump chamber 121' of unit B through the casing 64'. From this it is apparent that hydraulic fluid flow in conduits 131 and 133 is only in one direction at low pressure, e.g. 100–200 p.s.i. Any excess pressure in conduit 123 is absorbed by the accumulator 122.

The primary purpose of the accumulator 122 and relief valve 130 arrangement is to prevent cavitation in the pump chambers 121 and 121' which, due to the high reciprocation speeds the engine pump 63 is operated, may occur if atmospheric pressure was relied upon to feed the hydraulic fluid into the pump chambers 121 and 121'. Thus a hydraulic fluid inlet means has been described for supplying the pump chambers 121 and 121' with hydraulic fluid.

Figure 9:
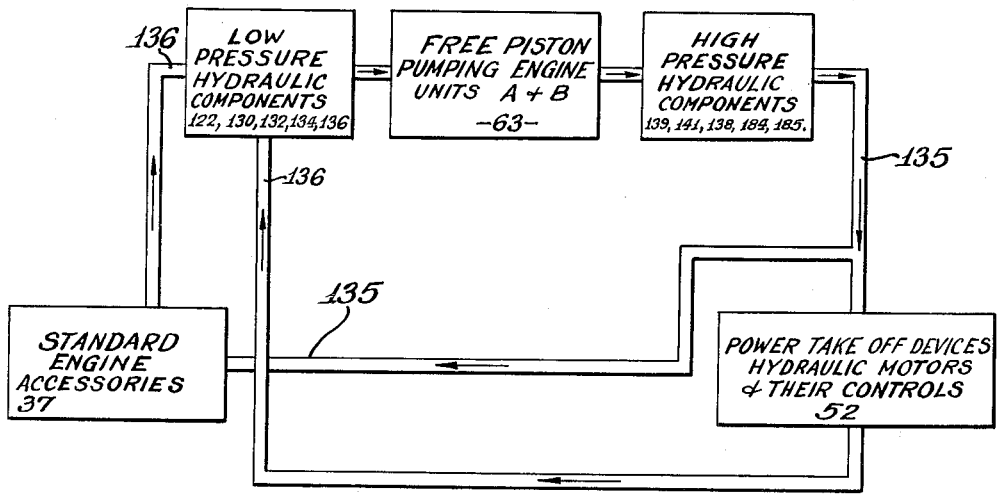
FIGURE 9 is a flow diagram illustrating the general flow of hydraulic fluid in operation of the tractor of FIGURE 1 by the free-piston engine hydraulic pump of this invention.

Again referring to FIGURE 6 there is shown an outlet conduit 135. The outlet conduit 135 leads to a high pressure accumulator, e.g., 5000 p.s.i., which may for convenience be constructed similar to accumulator 122 general design. The conduit 135 also leads to a receiver which in the present embodiment is the hydraulic control valves in the valve housing 52 (FIGURE 2) and the various hydraulic motors previously described; and the hydraulic discharge lines from the various motors are communicatively connected to port 136 of relief valve 130 (FIGURE 6) thus completing the hydraulic circuit as shown diagrammatically in FIGURE 9.

Hydraulic fluid discharged under high pressure from pump chamber 121 passes into conduit 137 which conduit passes through the casing 64. The hydraulic fluid in conduit 137 then passes through a stop valve, indicated generally at 138 (FIGURES 6 and 8), which stop valve is normally in open position as shown in full lines of FIGURE 8. A further description of the stop valve 138 and its function will be explained later. After the hydraulic fluid from conduit 137 passes through the stop valve 138 it then passes through outlet check valve 139. The outlet check valve 139 may for convenience be constructed similar to the inlet check valves 132 and 134. From the outlet check valve 139 the hydraulic fluid then passes into the outlet conduit 135. From this it can be seen that as the power pistons 68 and 69 of unit A reciprocate the pump pistons 103 and 102, respectively, also reciprocate in opposed relation. Thus when the pump pistons 103 and 102 move inboardly (power stroke of power piston 68 and 69) hydraulic fluid is discharged under high pressure into outlet conduit 135. Conversely when the pump pistons 103 and 102 move outboardly (compression stroke of power pistons 68 and 69) hydraulic fluid at low pressure (e.g., 100–200 p.s.i.) is admitted to pump chamber 121 and pump cylinders 64a from conduits 123 and 131.

Hydraulic fluid discharged under pressure from pump chamber 121' of unit B passes into conduit 140 and into conduit 135a through outlet check valve 141. The outlet check valve 141 may for convenience be constructed similar to inlet check valves 132 and 134. The conduit 135a communicates or merges with outlet conduit 135 as shown in FIGURE 6. It will be noted that the arrangement of outlet check valves 139 and 141 permits the hydraulic fluid under pressure from the pump chamber 121 and 121' to flow only in a discharge direction in conduits 137, 135, 135a and 140. Thus hydraulic fluid outlet means for the hydraulic pumps of both units A and B of engine pump 63 have been shown and described.

In the foregoing discussion of the operation of the free-piston engine pump 63 of this invention, the description was directed to where the engine pump 63 is in operating or running condition. Thus no means has yet been described for starting the engine pump 63. While there are numerous known methods for starting free-piston engines the method of starting the engine pump 63 of this invention is believed to be unique in that hydraulic fluid under pressure is employed which will now be explained in detail.

The first step required in the operation of starting the engine pump 63 according to this invention is the pre-positioning of the power pistons thereof. Referring to FIGURE 4 the power pistons 68, 68', 69 and 69' are shown in the start position. In this respect it will be seen that power pistons 68 and 69 of unit A are in the inboard position and of course the coupling means previously described necessarily places the power pistons 68' and 69' of unit B in the outboard position. At this point it is stated that unit A, according to this procedure, will fire first and thus unit B subsequently fires. However, it is obvious that when a free-piston engine is stopped after a previous run, the power pistons will usually come to rest somewhere between their maximum outboard or inboard positions. It is therefore necessary that some means be provided for moving the power pistons to the position shown in FIGURE 4.

In FIGURE 4 it will be seen that another pinion 142 is positioned about midway on the sleeve shaft 103 and constrained for rotation therewith. In meshed relation with pinion 142 is a rack member 143 integrally connected with end rods 144 and 145. The end rod 144 is slidably supported by bearing element 146 and extends therethrough. Likewise the end rod 145 is slidably supported by bearing element 147 in a similar manner. It will thus be apparent that when the engine pump 63 is in running operation the rack member 143 and its associated end rods 144 and 145 will reciprocate in parallel relation with power pistons 68 and 69'. It will be also apparent that when the engine pump 63 is stopped, the power pistons may be moved or shifted by applying a sufficient force in a longitudinal direction on the rack member 143. However, as explained above it is only necessary to move the power pistons 68 and 69 to their maximum inboard position. Thus in this case it is only necessary to impose a sufficient force in a longitudinal direction to move the rack member 143 rightwardly as viewed in FIGURE 4.

Mounted on the casings 64 and 64' on the leftward end, as viewed in FIGURE 4, between the units A and B and in longitudinal alignment with rack member 143 is a conventional one-way (single) acting hydraulic ram 148 spring loaded in retractive direction. When the ram 148 is energized by charging it with fluid under pressure through port 149 it expands to move its piston rod 150 rightwardly to abut the leftward end of rod 144 whereupon further expansion of the ram 148 moves rack member 143 toward the position illustrated in FIGURE 4. When the ram 148 is fully expanded the power pistons 68 and 69 of unit A will have moved to maximum inboard position as shown in FIGURE 4. Thereafter the ram 148 is de-energized and since it is spring loaded it will retract to the position shown in FIGURE 4.

At this point it is mentioned that when the ram 148 moves the power pistons 68 and 69 of unit A inboardly the hydraulic pump 120 will have its pump pistons 102 and 103 moving in a pumping stroke direction and thus the hydraulic fluid therein must be discharged through pump chamber 121. Referring to FIGURE 6 this fluid is expelled through conduit 137, stop valve 138, and check valve 139 into conduit 135. During expansion of the ram 148, the pump 120' of unit B will move on the intake stroke and thus does not discharge hydraulic fluid to the conduit 135.

The second step in the operation of starting the engine pump 63 is opening the flow of fuel to the injector mechanisms 78, 78', 87 and 87' in any conventional manner such as opening a fuel valve (not shown) leading from a source of fuel (not shown).

For the third step in the starting operation of the engine pump 63 reference is made to FIGURE 8. There is shown the hydraulic stop valve 138 which comprises a valve cylinder 151 having a slidable spool or plunger 152 therein. The spool 152 is provided with a pair of axially spaced lands 154 and 155 separated by a circumferential groove 153. The inlet port 156 is communicatively connected with the conduit 137 (FIGURE 6). The outlet port 157 is communicatively connected to the inlet side of the outlet check valve 139 (FIGURE 6). In the position shown in full lines (FIGURE 8) the plunger 152 communicates hydraulic fluid from conduit 137 to the conduit 135 and thus the valve 138 is in open position which is the normal position when the engine pump 63 is running.

Disposed in axial alignment with the stop valve 138 is another one-way (single) acting hydraulic ram 158 (FIGURE 8) which is spring loaded in a retractive direction. The end of the connecting rod 159 is positioned in abutting relation with the left end of the plunger 152 of the stop valve 138 as best shown in FIGURE 8. The port 160 of the ram 158 and associated conduit 170 may be regarded as a vent for the spring chamber 171. The ram 158 is energized by introducing hydraulic fluid under pressure in conduit 172 which enters the ram 158 through port 173 in a conventional manner. Thus it can be seen that when the ram 158 is energized expansibly it moves the plunger 125 to the stop valve 138 rightwardly whereby the circumferential groove moves out of registry with the outlet port 157 as indicated in dotted lines in FIGURE 8. Subsequent de-energization of the ram 158 results in retraction of the connecting rod 159 which then separates from abutting relation with the plunger 152 of the stop valve 138. From this it can be seen that if ram 158 is energized and then subsequently de-energized, the stop valve 138 moves from open position to closed position.

Again referring to FIGURE 8 a toggle device is generally indicated at 174. The toggle device 174 may conveniently be comprised of a lever 175 pivotally mounted to pin 176. In the lower portion of the lever 175 is an elongated slot 177 and at the bottom is mounted a roller 178 rotatably journalled to a pin 179 on the lever 175. On the rightward end of plunger 152 of the stop valve 138 is a rod 180 integrally connected thereto. The rightward end of rod 180 is provided with a pin 181 which is engaged slidably with the elongated slot 177 of lever 175. A tension spring 182 is stationarily anchored at one end 183 and the other end connected to the lower end portion of the lever 176. It will be observed that a line coinciding with the line between the tension spring anchor 183 and pivot pin 176 of the lever 175 designates a "dead center" position for the lever 175. The elongated slot 177 provides lost motion to accommodate the linearly movable pin 181 as the lever 175 at slot 177 moves arcuately. In the position of lever 175 shown in full lines in FIGURE 8, the roller 179 of the lever 175 is to the left of dead center position and thus the spring 182 maintains the plunger 152 of stop valve 138 in leftward position as illustrated. However when the ram 158 is energized the rightward movement of plunger 152 and associated rod 180 moves the lever 175 slightly to the right of dead center. Subsequent de-energizing of ram 158 thus leaves the stop valve 138 in closed position and the toggle device 174 with its lever 175 slightly to the right of dead center is in a cocked position. From this it is apparent that only a slight force on the roller 178 in a leftward direction will move the lever 175 to the left of dead center position and thus the tension spring 182 moves the plunger 152 of the stop valve 138 to open position. Means will now be described for providing a force in a leftward direction to trip the toggle device 174 for opening the stop valve 138.

Referring back to FIGURE 4 on the upper end of the main shaft 88 is a cam 184 constrained for rotation therewith. The profile of the cam 184 is shown in FIGURE 8. In the first step for starting the engine pump 63 the main shaft 88 of the coupling means is rotated to the position shown in FIGURE 8. Thus when the third step is performed, i.e., energizing of ram 158 to close the stop valve 138 and cock the toggle device 174 and thereafter de-energizing the ram 158, the roller 178 and lever 175 assume the position shown in dotted lines in FIGURE 8 but the roller 178 is not in engagement with the cam 184. The engine pump 63 is now in position for the fourth and final step in the starting operation.

The fourth and final step in the starting operation consists of introducing extreme hydraulic pressure, e.g., 10,000 p.s.i., into the pump chamber 121 of unit A whereby the pump pistons 102 and 103 are moved under hydraulic pressure outboardly. This of course moves the power pistons 68 and 69 of unit A on compression stroke. Movement of power pistons 68 and 69 also rotates cam 90 which at the appropriate position actuates the fuel injector mechanisms 78 and 87 to charge combustion chambers 71 and 72, respectively, with metered fuel charges. When the power pistons 68 and 69 approach maximum outboard position firing occurs in the combustion chambers 71 and 72. At this point the main shaft 88 will have rotated whereby the cam 184 (FIGURE 8) triggers the toggle device 174 thereby opening the stop valve 138. The power pistons 68 and 69 now move inboardly and hydraulic fluid in the hydraulic pump 121 is discharged to the conduit 135 as previously explained. The engine pump 63 is now running as power pistons 68' and 69' of unit B will fire alternately with power pistons 68 and 69 of unit A as previously explained. Thus it is apparent that hydraulic fluid admitted at low pressure into port 136 of relief valve 130 (FIGURE 6) will be pumped at high pressure into conduit 135. The means for charging the pump chamber 121 of unit A with hydraulic fluid at extreme high pressure in the fourth step of starting the engine pump 63 will now be explained.

Referring to FIGURE 6 it will be seen that an inlet check valve 185 is communicatively connected to conduit 137 through branch conduit 137a Now if a metered quantity of hydraulic fluid at extremely high pressure (e.g. 10,000 p.s.i.) is suddenly admitted into port 186 of check valve 185 as the fourth step in the operation of starting the engine pump 63, the stop valve 138 being closed (third step) prevents discharge therethrough and the check valve 132 prevents reverse flow therethrough, the result being a charging of the pump chamber 121 of unit A. The extreme high pressure in the pump chamber 121 thus actuates the inboard positioned pump pistons 102 and 103 to move the power pistons 68 and 69 outboardly on compression stroke. When the power pistons 68 and 69 reach outboard position firing occurs in the combustion chambers 71 and 72 thereby driving power pistons 68 and 69 inboardly on power stroke. At the point of firing the stop valve 138 is opened by snap action at the urging of tension spring 182 resulting from the actuation of toggle device 174 by cam 184 as previously explained. Thus as the power pistons 68 and 69 move inboardly on power stroke hydraulic fluid in the hydraulic pump 120 is discharged into conduit 135 also previously explained.

In order to avoid the possibility of hydraulic lock and damage to the engine pump 63 which may occur if firing of combustion chambers 71 and 72 takes place prematurely, or if a time interval between firing and the opening of the stop valve 138 elapses, the system is provided with a relief valve 187 (FIGURE 6) communicatively connected to the conduit 137a The relief valve 187 is set to open at a hydraulic pressure slightly above the extreme hydraulic pressure introduced into port 186 of check valve 185 Thus the relief valve 187 does not open under the influence of the extreme high pressure employed to start the engine pump 63 but does provide an exit should hydraulic lock occur in the system. Hydraulic fluid which might be discharged through the discharge port 188 of relief valve 187 may conveniently be returned to the inlet side of the extreme pressure source (not shown). On the other hand if excessive amount of extreme high pressure hydraulic fluid is admitted into port 186 of check valve 185 after the stop valve 138 has opened, the excess passes into conduit 135 through the check valve 139.

When the engine pump 63 of this invention is running, it will be observed that the usable hydraulic presure available for propelling the tractor 10 through its hydrostatic power transmission as well as hydraulic motors for its power accessories previously described is equal to the pressure differential between the hydraulic pressure in conduit 135 (e.g., 5000 p.s.i.) and the hydraulic intake pressure (e.g., 100–200 p.s.i.) at the inlet port 136 of check valve 130 (FIGURE 6) or in the exemplary case a working pressure of 4800 to 4900 p.s.i.

Having thus described a preferred embodiment of the invention it can now be seen that the objects of the invention have been fully achieved and it must be understood that changes and modifications may be made which do not depart from the spirit of the invention nor from the scope thereof as defined in the appended claims.

What is claimed is:

1. A free-piston engine hydraulic pump comprising in combination adjacent first and second power units, each of said units having a casing with a pair of power pistons therein positioned for reciprocation in axially opposed directions in synchronized relation, a fuel-air combustion chamber disposed outboardly of each of said power pistons in said casings, a positive drive coupling means operatively connected to said units adapted to synchronize the power pistons of said first unit in alternate power stroke relation with the power pistons of said second unit, a hydraulic pump piston operatively connected inboardly to each of said power pistons, hydraulic pump cylinders mounted on said casings positioned to receive in cooperative relation each of said pump pistons, valve means adapted to communicate inlet hydraulic fluid from a low pressure hydraulic fluid source to said pump cylinders independently to each of said units and discharge hydraulic fluid independently from the pump cylinders of each of said units to a high pressure hydraulic fluid receiver whereby a portion of the fuel-air combustion energy for moving the power pistons inboardly of one unit is transferred by said coupling means to move the power pistons of the other unit outboardly for compression in the fuel-air combustion chambers thereof and at least a portion of the balance of said energy is utilized to pump hydraulic fluid from said low pressure source to said high pressure receiver by said hydraulic pump pistons and hydraulic cylinders.

2. A free-piston engine hydraulic pump comprising in combination adjacent first and second power units, each of said units having a casing with a pair of power pistons therein positioned for reciprocation in axially opposed directions in synchronized relation, a fuel-air combustion chamber disposed outboardly of each of said power pistons in said casings, a positive drive coupling means operatively connected to said units adapted to synchronize the power pistons of said first unit in alternate power stroke relation with the power pistons of said second unit, a hydraulic pump piston operatively connected inboardly to each of said of said power pistons, hydraulic pump cylinders mounted on said casings positioned to receive in cooperative relation each of said pump pistons, a first inlet check valve communicatively connecting the pump cylinders of said first unit with a superatmospheric low presure hydraulic fluid source, a first outlet check valve communicatively connecting the pump cylinders of said first unit with a high pressure hydraulic fluid receiver, a second inlet check valve communicatively connecting the pump cylinders of said second unit with said superatmospheric low pressure hydraulic fluid source, and a second outlet check valve communicatively connecting the pump cylinders of said second unit with said high pressure hydraulic fluid receiver whereby a portion of the energy of the power stroke of one unit is transferred by said coupling means to move the power pistons of the other unit in compression stroke and at least a portion of the balance of said energy is utilized to pump hydraulic fluid from said low pressure source to said high pressure receiver by said hydraulic pump pistons and hydraulic pump cylinders.

3. A free-piston engine hydraulic pump comprising in combination adjacent first and second power units, each of said units having a casing with a pair of power pistons therein positioned for reciprocation in axially opposed relation, a fuel-air combustion chamber disposed outboardly of each of said power pistons in said casings, a positive drive coupling means operatively connected to said units adapted to synchronize the power pistons of said first unit in alternate power stroke relation with the power pistons of said second unit, a hydraulic pump piston operatively connected inboardly to each of said power pistons, hydraulic pump cylinders mounted on said casings positioned to receive in cooperative relation each of said pump pistons, a first pump chamber disposed in the casing between said pump cylinders of said first unit, a second pump chamber disposed in the casing between said pump cylinders of said second unit, each of said pump chambers being communicatively connected to its adjacent pump cylinders, valve means adapted to communicate inlet hydraulic fluid from a low pressure hydraulic fluid source independently to each of said pump chambers and discharge hydraulic fluid independently from each of said pump chambers to a high pressure hydraulic fluid receiver whereby a portion of the fuel-air combustion energy for moving the power pistons inboardly of one unit is transferred by said coupling means to move the power pistons of the other unit outboardly for compression in the fuel-air combustion chambers thereof and at least a portion of the balance of said energy is utilized to pump hydraulic fluid from said low pressure source to said high pressure receiver by said hydraulic pump pistons and by hydraulic pump cylinders.

4. A free-piston engine hydraulic pump comprising in combination adjacent first and second units, each of said units having a casing with a pair of power pistons therein positioned for reciprocation in axially opposed directions in synchronized relation, a fuel-air combustion chamber disposed outboardly of each of said power pistons in said casings, a positive drive coupling means operatively connected to said units adapted to synchronize the power pistons of said first unit in alternate power stroke relation with the power pistons of said second unit, a hydraulic pump piston operatively connected inboardly to each of said power pistons, hydraulic pump cylinders mounted on said casing positioned to receive in cooperative relation each of said pump pistons, a first inlet check valve communicatively connecting the pump cylinders of said first unit with a low pressure hydraulic fluid source, a first outlet check valve communicatively connecting the pump cylinders of said first unit with a high pressure hydraulic fluid receiver, a second inlet check valve communicatively connecting the pump cylinders of said second unit with said low pressure source, and a second outlet check valve communicatively connecting the pump cylinders of said second unit with said high pressure receiver whereby a portion of the fuel combustion energy for moving the power pistons inboardly of one unit is transferred by said coupling means to move the power pistons of the other unit outboardly for compression in the fuel-air combustion chambers thereof and at least a portion of the balance of said energy is utilized to pump hydraulic fluid from said low pressure source to said high pressure receiver by said hydraulic pump pistons and hydraulic pump cylinders.

5. A free-piston engine hydraulic pump comprising adjacent first and second units, each of said units having a casing with a pair of power pistons therein positioned for reciprocation in axially opposed directions in synchronized relation, a fuel-air combustion chamber disposed outboardly of each of said power pistons in said casings, a positive drive coupling means operatively connected to said units adapted to synchronize the power pistons of said first unit in alternate power stroke relation with the power pistons of said second unit, a hydraulic pump piston operatively connected inboardly to each of said power pistons, hydraulic pump cylinders mounted on said casings positioned to receive in cooperative relation each of said pump pistons, a first pump chamber disposed in the casing between said pump cylinders of said first unit, a second pump chamber disposed in said casing between said pump cylinders of said second unit, each of said pump chambers being communicatively connected to its adjacent pump cylinders, a first inlet check valve communicatively connecting said first pump chamber with a low pressure hydraulic fluid source, a first outlet check valve communicatively connecting said first pump chamber with a high pressure hydraulic fluid receiver, a second inlet check valve communicatively connecting said second pump chamber with said low pressure source, and a second outlet check valve communicatively connecting said second pump chamber with said high pressure receiver whereby a portion of the fuel combustion energy for moving the power pistons inboardly of one unit is transferred by said coupling means to move the power pistons of the other unit outboardly for compression in the fuel-air combustion chambers thereof and at least a portion of the balance of said energy is utilized to pump hydraulic fluid from said low pressure source of said high pressure receiver by said hydraulic pump pistons and hydraulic pump cylinders.

6. A free-piston engine hydraulic pump of the opposed power piston type comprising in combination first and second power pistons positioned for reciprocation in axially opposed directions and third and fourth power pistons positioned for reciprocation in axially opposed directions, positive drive coupling means adapted to link said first and fourth power pistons for movement in one direction and link said second and third power pistons for movement in the other direction simultaneously wherein said first and second power pistons are in alternate power stroke relation with respect to said third and fourth power pistons, a hydraulic pump operatively connected to each of said power pistons, a first pump chamber communicatively connected to the pumps of said first and second power pistons and a second pump chamber communicatively connected to the pumps of said third and fourth power pistons, a first inlet check valve connected communicatively to said first chamber and a second inlet check valve connected communicatively to said second chamber, a low pressure hydraulic fluid source communicatively connected to said inlet check valves, a first outlet check valve connected communicatively to said first chamber and a second outlet check valve communicatively connected to said second chamber, and a high pressure hydraulic fluid receiver communicatively connected to said outlet check valves whereby a portion of the energy of the power stroke of one pair of power pistons is utilized through said coupling means to move the other pair of power pistons in compression stroke and substantially the balance of said energy is utilized for pumping hydraulic fluid from said low pressure source to said high pressure receiver by said hydraulic pumps.

References Cited in the file of this patent

UNITED STATES PATENTS

| | | |
|---|---|---|
| 2,755,988 | Wachsmuth | July 24, 1956 |
| 2,823,653 | Dildine | Feb. 18, 1958 |
| 2,863,426 | Summerlin | Dec. 9, 1958 |
| 2,914,909 | Kubik | Dec. 1, 1959 |
| 2,919,685 | Wachsmuth | Jan. 5, 1960 |
| 2,924,068 | Pereda | Feb. 9, 1960 |
| 2,972,224 | Forster | Feb. 21, 1961 |